Patented Jan. 1, 1946

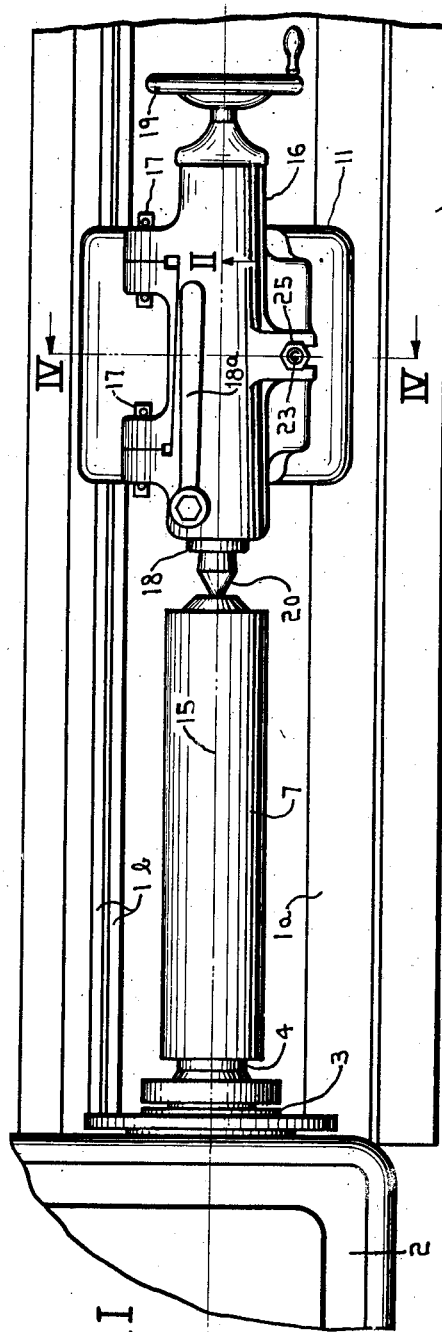
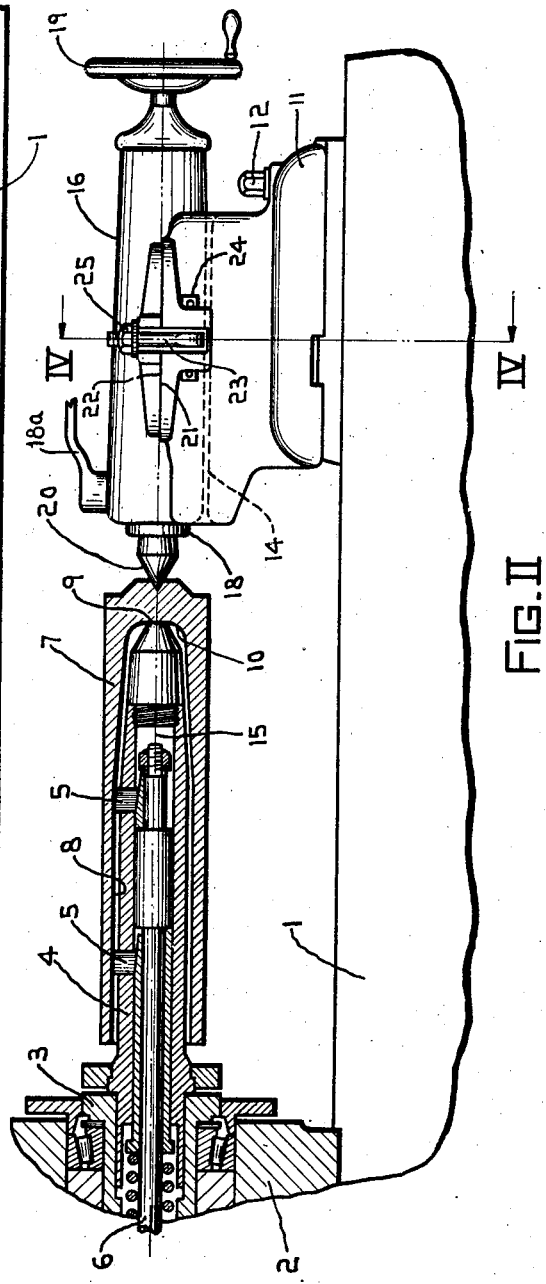

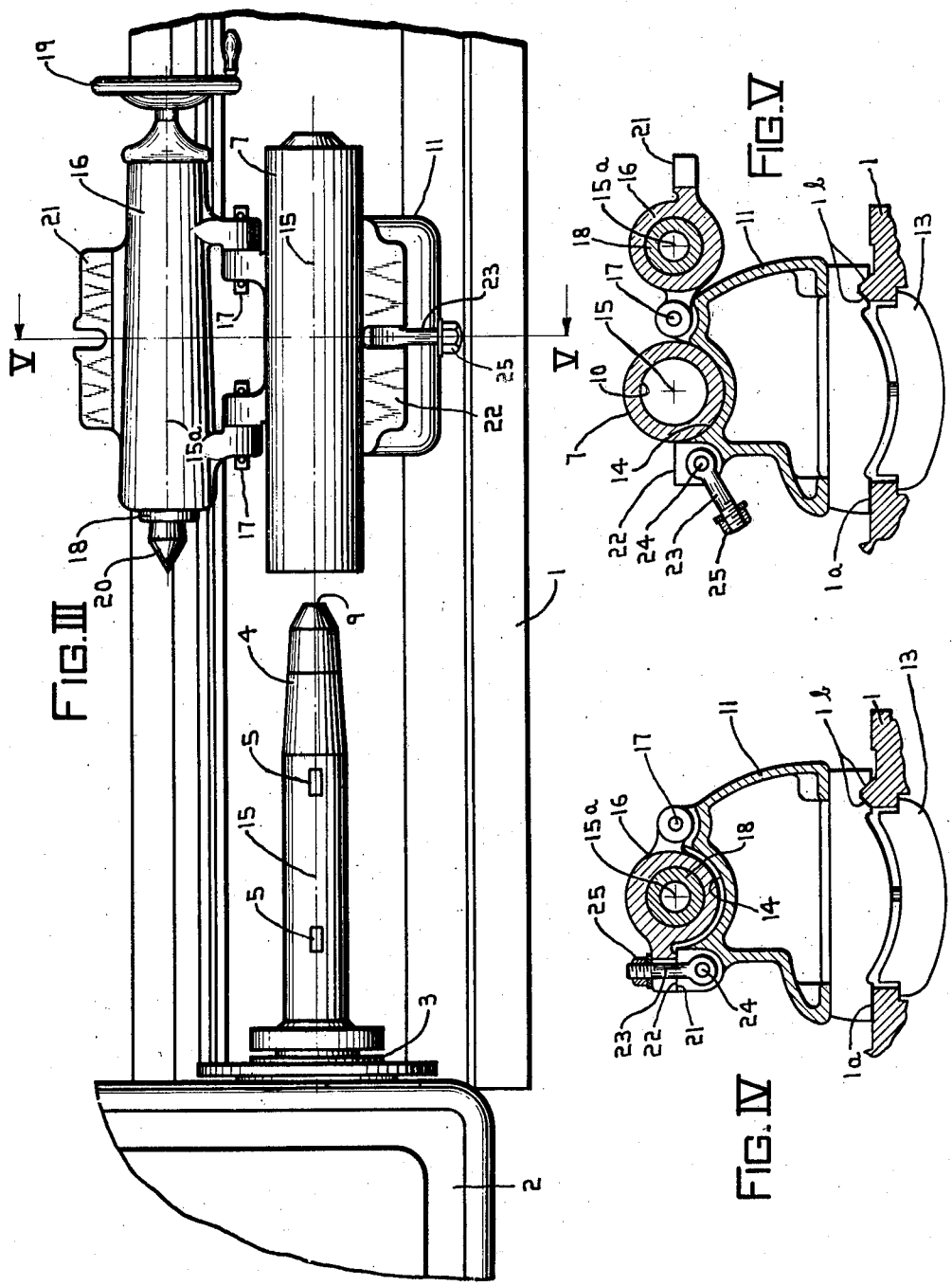

2,392,186

UNITED STATES PATENT OFFICE 2,392,186

WORK HANDLING MECHANISM

Henry C. Pierle, Cincinnati, Ohio, assignor, by mesne assignments, to R. K. Le Blond Machine Tool Company, Cincinnati, Ohio, a corporation of Delaware Application August 31, 1942, Serial No. 456,733

9 Claims. (Cl. 82—31)

This invention pertains to improvements in mechanism and apparatus for loading and unloading work in machine tools and is particularly related to work handling mechanism for placing a work piece on, or withdrawing it from, a work spindle of a lathe or like machine tool.

More specifically, it is an object to provide work handling mechanism in conjunction with a lathe whereby work may be loaded on the work spindle without interfering with the tailstock and without requiring longitudinal movement of the tailstock while at the same time permitting its center to support the end of the work after it is chucked on the lathe spindle.

Another object of this invention is to provide work handling mechanism in a lathe having a work spindle and a tailstock for supporting the work, in which the tailstock may be moved back away from alignment with the work spindle axis, at which time the base or supporting member for the tailstock provides a work supporting rail or trough in alignment with the work spindle axis upon which the work may be placed and moved axially on or off the work spindle of the lathe. After thus placing the work piece in this trough in the base of the tailstock on the bed of the machine and moving it axially on to the work spindle, the tailstock may then be moved back into position and into this trough, so that it, in turn will be brought into alignment with the work spindle. In this way its center may be properly engaged with and locked in position for supporting the end of the work piece on the work spindle.

This invention is especially adapted to work pieces which must be loaded axially on and removed from a work spindle, as in shell turning lathes wherein the work spindle must be extended longitudinally a relatively great distance into the elongated work piece. This invention is also well adapted for center drive lathes, particularly of the crankshaft type, in which it is necessary to load the work piece or crankshaft axially inside of the center drive gear work spindle for chucking it and rotating it to expose its end portions for machining operations.

Further features and advantages of this invention will appear from the detailed description of the drawings in which:

Figure I is a fragmentary plan view of a lathe incorporating the novel tailstock and loading trough arrangement shown with the tailstock in operating position supporting the end of the work piece on the lathe spindle.

Figure II is a fragmentary front elevation of the lathe shown partly in section on the line II—II of Figure I.

Figure III is a fragmentary plan view like that of Figure I, but showing the tailstock moved back out of alignment with the work spindle and with a work piece positioned in the loading trough of the tailstock base in alignment with the work spindle, preparatory to being loaded on the work spindle, or which has just been removed therefrom.

Figure IV is a transverse cross section through the tailstock and bed of the lathe, shown on the line IV—IV of Figures I and II, illustrating the tailstock in the working position in alignment with the work spindle axis.

Figure V is a similar transverse view through the tailstock and lathe bed on the line V—V of Figure III, showing the tailstock in the withdrawn position, away from alignment with the work spindle axis, and a work piece resting in the loading trough of the tailstock base.

For illustrative purposes, this invention is shown applied to a typical lathe having a bed or frame 1 upon which is mounted a headstock 2 carrying a rotatable work spindle 3 which is suitably driven from the headstock transmission. In this particular showing, the work spindle has applied to it an expanding mandrel type chuck 4 having appropriate work engaging jaws 5 which may be actuated by suitable mechanism (not shown) connected to the actuating rod 6 of the mandrel chuck. This mandrel chuck is adapted, in this particular instance, to gripping a work piece or shell 7 by means of its internal bore 8 and to locate it lengthwise of the mandrel by means of an abutment surface 9 which engages in the end 10 of the bore 8 of the shell.

It is to be understood, however, that this invention is equally well adapted to work spindles of more conventional types and also work spindles of the center drive type in which the work is placed axially into the center drive chuck and projects from each end of the center drive ring gear work spindle.

The novel work handling mechanism applied to the tailstock of the lathe comprises a tailstock housing or base 11 which is rigidly fixed to the bed 1 of the machine in the conventional manner, as by means of the bolts 12 which pass down through the clamp 13 and draw the tailstock base or housing 1 rigidly on the bed ways 1a and 1b of the lathe. This tailstock housing 11, as best seen in Figure V, has in this particular instance a semi-circular trough portion 14 which is arranged with its center in alignment with the axis of rotation 15 of of the work spindle, so that the shell or work piece 7 may be initially placed in this semi-circular trough 14 as seen in Figure III, whereupon it will be aligned with the axis 15 of the work spindle 3 and its mandrel 4. Thus, in this way, the shell is automatically positioned in alignment with the work spindle and is also guided in this alignment while it is slid onto or off of the work spindle mandrel 4 to thereby automatically align the work piece and to greatly facilitate the axial loading and unloading of the work piece without careful guiding or the necessity of the operator supporting the weight of the shell as it is being thus loaded on the work spindle. During this time, the tailstock barrel body 16 is moved back out of the way on the hinge pins 17 formed in the tailstock housing 11 as best shown in Figure V. This body 16 carries the usual axially slidable tailstock barrel 18 which may be actuated by the conventional handwheel 19 so as to present its center 20 into the end of the work piece 7 to force it up against the stop 9 to support the end of the work piece and give additional rigidity to the mandrel 4, as best seen in Figure II, when fully engaged with an appropriate center hole in the end of the shell 7. Suitable locking means operated by a wrench 18a may be provided to lock the barrel in engaged position with the work.

After the work piece 7 has been presented on the loading trough 14 of the base 11 fixed to the bed 1 of the lathe and has been slid axially (to the left in Figure III) on to the mandrel 4, the tailstock is then moved forward into the position shown in Figure V, whereupon its surface will engage a mating surface 22 of the tailstock housing 11 so that its center axis 15a will be brought into alignment with the work spindle axis 15 and it may be locked rigidly in this position by means of an appropriate clamping means such as the eye-bolt 23, carried on a suitable hinge pin 24 fixed in the tailstock housing 11 and having a suitable clamping nut 25 which may be brought down on top of the portion containing the surface 21, so as to rigidly lock it against the surface 22 and therefore hold the tailstock in precise alignment and rigidly for supporting the work when on the work spindle.

After the work has been machined, the nut 25 and eye-bolt 23 are loosened and removed from the tailstock body 16 and the tailstock body is then moved away from axial alignment with the work spindle, as shown in Figure V, thereby exposing the work carrying trough 14 which is in alignment with the work spindle 13. The work is then axially slid off the spindle, where it is easily lifted away from the machine and an unfinished work piece presented to the trough 14 for again axially sliding it onto the work spindle or mandrel 4.

It is to be further understood that the operation of moving the tailstock back out of the way, of moving its center into the work, and for locking the center in work engaging position, may all be accomplished by suitable power means, operating in an appropriate sequential relationship, if desired, while still utilizing the principles of this invention.

Having thus fully set forth and described my invention, what I claim as new and desire to secure by United States Letters Patent is:

1. In a tailstock for lathe; a base; means for rigidly fixing said base on the bed of said lathe; a work loading and unloading trough formed in said base in alignment with the work spindle of said lathe; a tailstock barrel body portion mounted on said base for movement into and out of said trough to and from aligned position with the spindle axis, said tailstock barrel body, when moved out of said trough away from aligned position from said work spindle axis, exposing said loading and unloading trough in said base; a tailstock barrel axially movable in said body portion; a center in said barrel; and means for actuating said barrel axially longitudinally of said work spindle axis to engage or disengage said center with a work piece on said work spindle of said machine tool; and locking means on said body portion for rigidly clamping said tailstock barrel in said body portion when engaged with a work piece on said work spindle.

2. In a tailstock for lathe; a base; means for rigidly fixing said base on the bed of said lathe; a work loading and unloading trough formed in said base in alignment with the work spindle of said lathe; a tailstock barrel body portion mounted on said base for movement into and out of said trough to and from aligned position with the spindle axis, said tailstock barrel body, when moved out of said trough away from aligned position from said work spindle axis, exposing said loading and unloading trough in said base; a tailstock barrel axially movable in said barrel body portion; a center in said barrel, and means for actuating said barrel axially longitudinally of said work spindle axis to engage or disengage said center with a work piece on said work spindle; locking means on said barrel body portion for rigidly clamping said tailstock barrel in said body portion when engaged with a work piece on said work spindle; and means for locking said tailstock body portion rigidly to said base when aligned with said spindle axis.

3. In a lathe; a bed; a headstock mounted on said bed; a rotatable work spindle journaled in said headstock; a work gripping device on said work spindle adapted to axial loading of work pieces; a tailstock on said bed comprising a base fixed to said bed; a tailstock barrel body movably mounted on said base for movement into or out of a semi-circular work loading trough formed in the top portion of said base in alignment with said work spindle; and means whereby the movement of said tailstock barrel body out of said trough from aligned position with said work spindle exposes said loading trough for insertion or removal of work from said work spindle.

4. In a lathe; a bed; a headstock mounted on said bed; a rotatable work spindle journaled in said headstock; a work gripping device on said work spindle adapted to axial loading of work pieces; a tailstock on said bed comprising a base fixed to said bed; a tailstock barrel body movably mounted on said base for movement into or out of a semi-circular work loading trough formed in the top portion of said base in alignment with said work spindle; and means whereby the movement of said tailstock barrel body out of said trough from aligned position with said work spindle exposes said loading trough for insertion or removal of work from said work spindle; and means whereby said tailstock may be moved into aligned position with said work spindle when presented in said loading trough.

5. In a lathe; a bed; a headstock mounted on said bed; a rotatable work spindle journaled in said headstock; a work gripping device on said work spindle adapted to axial loading of work pieces; a tailstock on said bed comprising a base fixed to said bed; a tailstock barrel body movably mounted on said base for movement into and out of a semi-circular work loading trough formed in the top portion of said base in alignment with said work spindle; and means whereby the movement of said tailstock barrel body out of said trough from aligned position with said work spindle exposes said loading trough for insertion or removal of work from said work spindle; and means whereby said tailstock may be moved into aligned position with said work spindle when presented in said loading trough; and means for locking said tailstock barrel body to said base when in position in said loading trough in alignment with said work spindle.

6. In a tailstock; a base; a work carrying trough formed in said base in alignment with the spindle axis of a machine tool upon which said tailstock is mounted; a tailstock barrel body; pivotal means for connecting said barrel body with said work carrying trough and constructed and arranged to allow for shifting of said barrel body into and out of concentric position with said tailstock trough and into and out of alignment with said work spindle axis; and means for holding said tailstock barrel body rigidly on said base when in said trough in aligned position with said work spindle.

7. In a tailstock for lathe; a base; means for rigidly fixing said base on the bed of said machine tool; a work loading and unloading trough formed in said base in alignment with the work spindle of said lathe; a tailstock barrel body portion movable relative to said base into and out of said trough to and from aligned position with the spindle axis; pivotal means for connecting said barrel body with said trough and constructed and arranged to allow for shifting of said barrel body into and out of concentric position with said trough and into and out of alignment with said work spindle axis; said tailstock barrel body, when moved out of said trough away from aligned position with said work spindle axis, exposing said loading and unloading trough in said base for presenting work to said work spindle.

8. In a tailstock for lathe; a base; means for rigidly fixing said base on the bed of said lathe; a work loading and unloading trough formed in said base in alignment with the work spindle of said lathe; a tailstock barrel body portion mounted on said base for movement into and out of said trough to and from aligned position with the spindle axis; said tailstock barrel body, when moved out of said trough away from aligned position with the spindle axis; said tailstock barrel body, when moved out of said trough away from aligned position from said work spindle axis, exposing said loading and unloading trough in said base; pivotal means for connecting said barrel body with said trough and constructed and arranged to allow for shifting of said barrel body into and out of concentric position with said trough and into and out of alignment with said work spindle axis; a tailstock barrel axially movable in said barrel body; a center in said barrel; and means for actuating said barrel axially longitudinally of said work spindle axis to engage or disengage said center with a work piece on said work spindle.

9. In a lathe; a bed; a headstock mounted on said bed; a rotatable work spindle in said headstock; a tailstock comprising a base having an integral loading trough and a movable barrel body, said loading trough being permanently aligned with said work spindle and so constructed and arranged to engage and support a work piece in coaxial alignment with the axis of said spindle when said barrel body is removed, means for connecting said barrel body with said base for guiding said barrel body radially of said spindle axis into and out of concentric aligned position with said tailstock trough and into and out of alignment with said work spindle whereby, when said barrel body is moved radially out of said trough from alignment with said work spindle, said loading trough will be exposed for axially receiving work from or for holding work to be positioned on said work spindle while maintaining said work piece coaxially aligned with said work spindle axis.

HENRY C. PIERLE.